C. W. WILSON.
AUTOMOBILE TRAFFIC SIGNAL.
APPLICATION FILED APR. 24, 1917.
1,271,404.
Patented July 2, 1918.
3 SHEETS—SHEET 1.
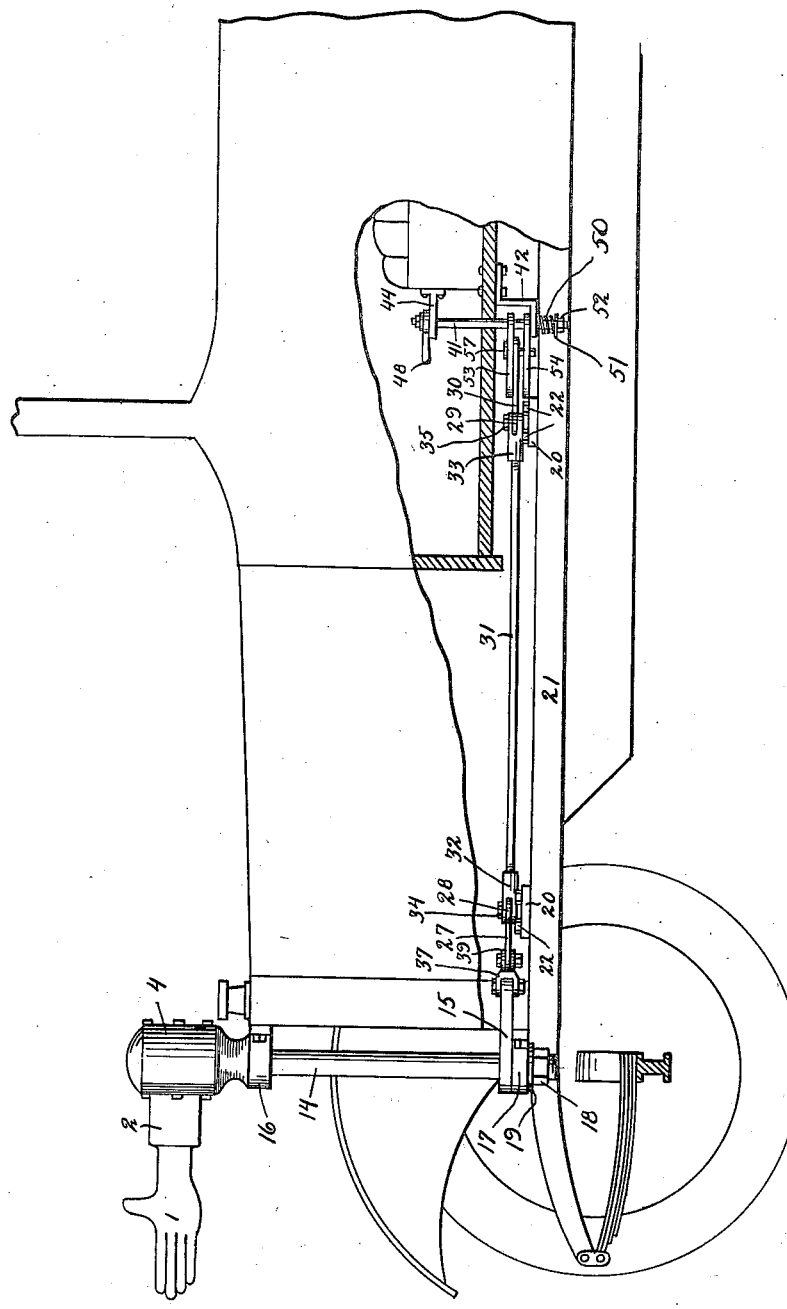
WITNESSES
INVENTOR
C. W. Wilson
BY Victor J. Evans
ATTORNEY

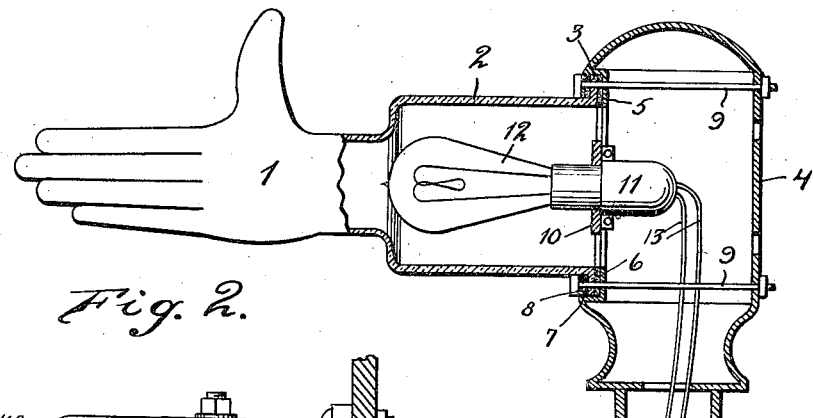
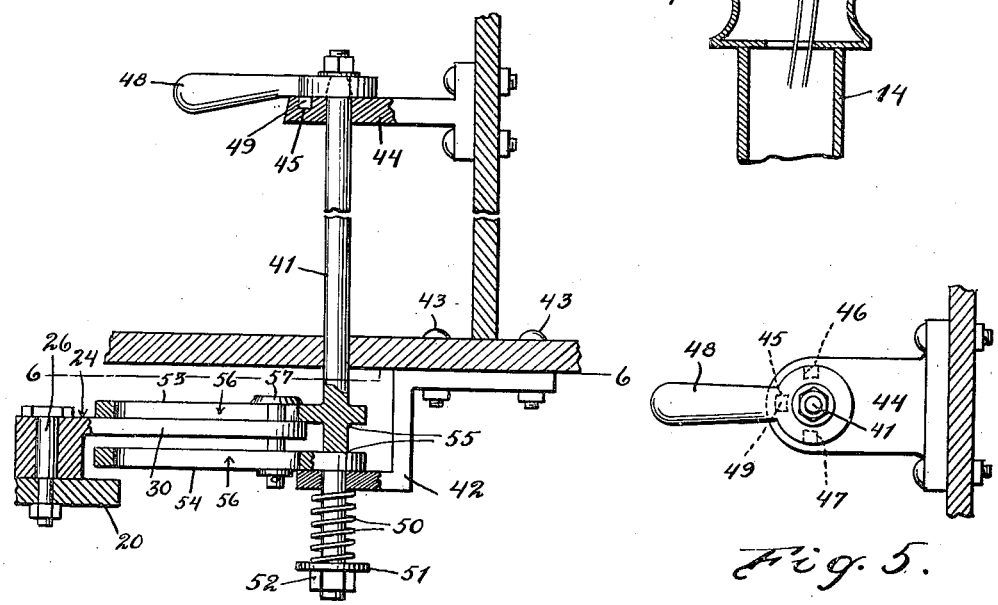
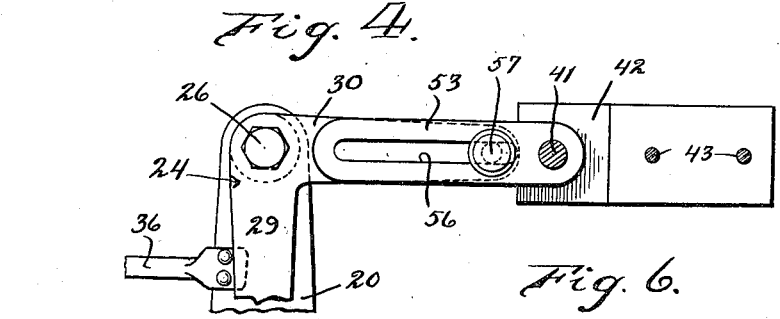

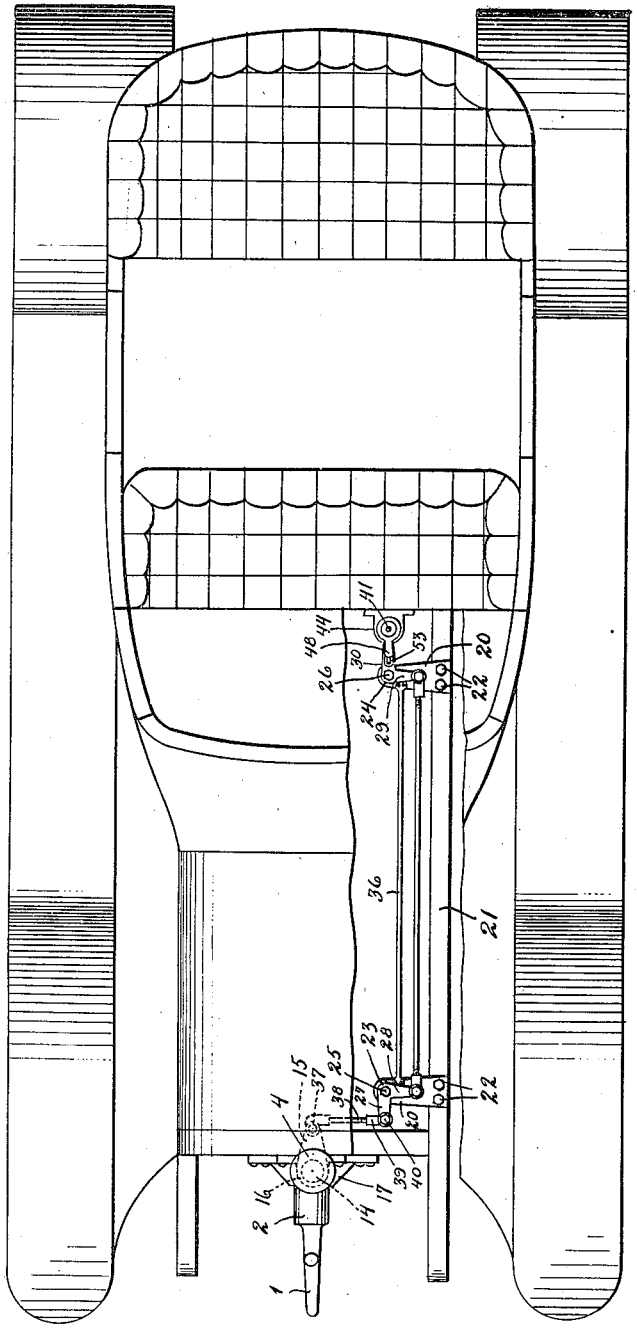

UNITED STATES PATENT OFFICE.

CHARLES W. WILSON, OF ST. LOUIS, MISSOURI.

AUTOMOBILE TRAFFIC-SIGNAL.

1,271,404.     Specification of Letters Patent.     Patented July 2, 1918.

Application filed April 24, 1917. Serial No. 164,190.

*To all whom it may concern:*

Be it known that I, CHARLES W. WILSON, a citizen of the United States, residing at St. Louis, in the State of Missouri, have invented new and useful Improvements in Automobile Traffic-Signals, of which the following is a specification.

This invention relates to improvements in traffic signaling apparatus for use on an automobile to indicate the intended course of an automobile whether straight ahead or to the right or left and thereby prevent collisions and other accidents, the object of the invention being to provide improved signaling apparatus of this kind which is simple in construction, which may be readily installed on an automobile and which may be readily manually controlled by the chauffeur.

The invention consists in the construction, combination and arrrangement of devices hereinafter described and claimed.

In the accompanying drawings:—

Figure 1 is a side elevation of a traffic signaling apparatus constructed and arranged in accordance with my invention and showing the same installed on an automobile, the latter being indicated in diagrammatic outline.

Fig. 2 is a detailed vertical section through the signaling hand and hood.

Fig. 3 is a plan of my improved traffic signaling apparatus with parts of the automobile indicated in diagrammatic outline.

Figs. 4, 5 and 6 are detailed views.

In the embodiment of my invention I provide a signaling hand 1 which is hollow and is made of glass or other suitable transparent material and is provided with a cuff portion 2 which is cylindrical in form and is opaque and is provided at the inner end with an outwardly extending annular flange 3. I also provide an upright cylindrical hood 4 which has an opening in which the rear or inner end of the cuff 2 is inserted, the hood being also provided with a flange 5. A gasket 6 of felt or other material is placed between the flanges of the hood and cuff. An outer gasket 7 is also provided, which is made of separable segments and on the outer side of the outer gasket is a segment washer 8. Bolts 9 extend through the gaskets and flanges and through the hood and secure the signaling device 1 to the hood, as will be understood. A cross bar 10 is arranged at the inner end of the cuff. A socket 11 for an electric lamp 12 is secured in the cross bar, the electric lamp being arranged in the cuff and serving when lighted to strongly illuminate the transparent signaling hand or device 1. Suitable conducting wires 13 are connected to the socket and to the dynamo or other source of electricity on the automobile. The lower end of the hood is welded or otherwise suitably secured to a standard 14 which is preferably tubular and through which the conducting wires extend. An arm 15 is secured to the standard near the lower end of the latter. The upper portion of the standard is mounted for turning movement in a bearing in a bracket 16 which is secured to the front side of the radiator near the top thereof and at a suitable point at or near the center. The lower portion of the standard is mounted in a bearing in a bracket 17 which is secured near the bottom of the radiator. A nut 18 is screwed to the lower end of the tubular standard, a washer 19 being interposed between the nut and the lower side of the arm 15.

I also provide a pair of horizontally arranged hanger arms or brackets 20 which extend inwardly from one side, preferably the left side, of the automobile chassis 21, the outer ends of said hanger arms being secured to the chassis by bolts 22. Bell crank levers 23, 24 are respectively pivotally mounted as at 25, 26 on the inner ends of the hanger arms or brackets. Said bell crank lever 23 has arms 27, 28. The bell crank lever 24 has arms 29, 30. The arms 29, 30 of the bell crank levers are connected together by a reach rod 31 which has clevises 32, 33 screwed on its ends and which are respectively pivotally connected to the outer ends of the arms 28, 29 as at 34, 35. A brace rod 36 connects and has its ends secured to the hanger arms or brackets 20 as shown.

A right-angled clevis 37 is pivotally connected to the rear end of the arm 15, which extends under the body of the automobile, by a pin or other suitable pivoting device. A reach rod 38 has one end screwed to the clevis 37 and the other end screwed to a clevis 39 which is pivotally connected as at 40 to the front end of the arm 27 of the bell crank lever 34.

A vertically arranged controlling shaft 41 has a bearing near its lower end in a step hanger 43 which is secured under the floor of the automobile as at 43 and at a point near the left hand side of the automobile. The upper portion of the controlling shaft has a bearing in a segment bracket 44 the said segment bracket being bolted in place and being provided with a forwardly extending notch 45 and also with right hand and left hand notches 46, 47 in its upper side. A controlling lever 48 is secured near the upper end of the controlling shaft, to turn the latter, and has a lug 49 on its lower side which may be engaged in either of the notches 45, 46, 47, the shaft 41 being vertically movable to a slight extent so that the said lug may be disengaged from any of the notches and the lever then turned and the lug reëngaged with another notch, as will be understood. A coil spring 50 is arranged on the lower portion of the controlling shaft and with its upper end bearing under the step hanger 42, the lower end of said spring bearing on a washer 51. A nut 52 is screwed to the lower end of the controlling shaft and bears under the washer as shown. A pair of lever arms 53, 54 are arranged in spaced relation, the former above the latter and the rear ends of said lever arms are secured as at 55 to the controlling shaft so that said lever arms may be turned by said shaft. Each of said arms has a longitudinal vertical slot 56. The rear arm 30 of the rear bell crank lever 24 is arranged between the lever arms 53, 54 and is connected thereto by a pivot pin 57 which is arranged for sliding movement in the slots 56.

The lever 48 is arranged in line with the lever arms 53, 54 and when said lever 48 is straight ahead, with its lug 49 engaged with the notch 45 of the segment the signaling hand or device 1 points straight ahead and this position should be maintained as long as the course of the automobile is straight ahead. When it is the intention to turn the automobile to the right or left the chauffeur moves the lever 48 in the indicated direction and thereby partly turns the controlling shaft 41. The consequent corresponding movement of the lever arms 53, 54 causes the bell crank 24 to be also partly turned and corresponding motion is imparted to the bell crank 28 through the rod 31 and the connections hereinbefore described. The bell crank 23 in connection with the reach rod 38 and arm 15 also causes the signal standard 14 to be turned so that the signaling device or hand is set in the direction in which it is proposed to turn the automobile and thus the course of the automobile is clearly signaled, traffic facilitated and danger of collisions and other accidents obviated.

It will be understood that the lamp 12 at night will be supplied with current so that the transparent signaling or other device 1 will be strongly illuminated and rendered conspicuous.

While I have herein shown and described a preferred form of my invention I would have it understood that changes may be made in the form, proportion and construction of the several parts, without departing from the spirit of my invention and within the scope of the appended claims.

Having thus described my invention, I claim:—

1. An automobile traffic signal comprising brackets for attachment to a radiator, a vertical signal shaft mounted in the brackets and having a signaling device at its upper end and a rearwardly extending arm at its lower end; hanger brackets for attachment to the chassis, a pair of angle elements pivotally mounted on said hanger brackets, a rod connecting one of said elements to the arm of the signal shaft, a connection between said elements, and controlling means connected to the other element and arranged to operate the same.

2. In an automobile traffic signal, a pivotally mounted element, a controlling shaft mounted for slight vertical movement and also for turning movement, a pair of spaced arms attached to said shaft and between which said element extends, each of said arms having a slot, a pin attached to said elements and arranged to travel in said slots, a segment, and a controlling lever on the shaft and arranged to engage the segment to lock the controlling shaft in adjusted positions.

In testimony whereof I affix my signature.

CHARLES W. WILSON.